United States Patent
Nash et al.

(10) Patent No.: US 10,389,948 B2
(45) Date of Patent: Aug. 20, 2019

(54) DEPTH-BASED ZOOM FUNCTION USING MULTIPLE CAMERAS

(71) Applicant: QUALCOMM Incorporated, San Diego, CA (US)

(72) Inventors: James Wilson Nash, San Diego, CA (US); Adarsh Abhay Golikeri, San Diego, CA (US); Narayana Karthik Sadanandam Ravirala, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 15/370,926

(22) Filed: Dec. 6, 2016

(65) Prior Publication Data

US 2018/0160046 A1    Jun. 7, 2018

(51) Int. Cl.
*H04N 5/232* (2006.01)
*H04N 5/225* (2006.01)
*H04N 13/00* (2018.01)

(52) U.S. Cl.
CPC ....... *H04N 5/23296* (2013.01); *H04N 5/2258* (2013.01); *H04N 5/23293* (2013.01); *H04N 2013/0081* (2013.01)

(58) Field of Classification Search
CPC .............. H04N 5/23296; H04N 5/2258; G06F 3/04883
See application file for complete search history.

(56) References Cited

U.S. PATENT DOCUMENTS

| | | | |
|---|---|---|---|
| 6,992,699 B1 | 1/2006 | Vance et al. | |
| 8,212,897 B2 * | 7/2012 | Steinberg | H04N 5/272 348/208.4 |
| 9,215,381 B2 * | 12/2015 | Yang | G06T 5/002 |
| 9,396,590 B2 * | 7/2016 | Jung | G06T 3/40 |
| 10,154,186 B2 * | 12/2018 | Kang | G06F 3/04883 |

(Continued)

FOREIGN PATENT DOCUMENTS

| | | |
|---|---|---|
| EP | 2395761 A2 | 12/2011 |
| KR | 101633342 B1 | 6/2016 |
| WO | WO-2008014350 A1 | 1/2008 |

OTHER PUBLICATIONS

Fast mode selection algorithm based on texture analysis for 3D-HEVC intra prediction; Silva et al; 2014.*

(Continued)

*Primary Examiner* — Luis Perez-Fuentes
(74) *Attorney, Agent, or Firm* — Paradice and Li LLP

(57) ABSTRACT

A method for displaying preview images is disclosed. In one aspect, the method includes: receiving first images captured by a first camera having a first field-of-view (FOV), receiving second images captured by a second camera having a second FOV that is different than the first FOV, and displaying preview images generated based on the first and second images. The method may further include determining a spatial transform based on depth information associated with individual pixels in the first and second images, and upon receiving instructions to zoom in or out beyond a camera switching threshold, modifying the second image using the spatial transform and displaying the first image and the modified second image consecutively.

30 Claims, 10 Drawing Sheets

(56) References Cited

U.S. PATENT DOCUMENTS

| | | | |
|---|---|---|---|
| 2004/0061787 A1* | 4/2004 | Liu | H04N 5/232 |
| | | | 348/218.1 |
| 2010/0321530 A1* | 12/2010 | Baek | H04N 5/232 |
| | | | 348/231.99 |
| 2011/0063494 A1* | 3/2011 | Chou | H04N 5/23212 |
| | | | 348/349 |
| 2013/0113962 A1* | 5/2013 | Li | G06T 5/50 |
| | | | 348/240.2 |
| 2013/0271637 A1* | 10/2013 | Park | H04N 5/23216 |
| | | | 348/333.11 |
| 2014/0340543 A1 | 11/2014 | Nakada et al. | |
| 2015/0334309 A1 | 11/2015 | Peng et al. | |
| 2016/0041684 A1* | 2/2016 | Rhee | G06F 3/0416 |
| | | | 345/173 |
| 2016/0212411 A1* | 7/2016 | Lindner | G01C 11/00 |
| 2016/0241791 A1* | 8/2016 | Narayanswamy | G06T 15/00 |
| 2016/0353012 A1* | 12/2016 | Kao | H04N 5/23216 |
| 2017/0126968 A1* | 5/2017 | Somanath | H04N 13/207 |
| 2017/0230585 A1* | 8/2017 | Nash | H04N 5/23241 |
| 2018/0160046 A1* | 6/2018 | Nash | H04N 5/23296 |

OTHER PUBLICATIONS

Display 3D Production and Delivery Using the Layered Depth Video Format; Bartezak; 2011. (Year: 2011).*
Fast mode selection algorithm based on texture analysis for 3D hevc prediction; Silva; 2014. (Year: 2014).*
Google Search for NPL; 2019. (Year: 2019).*
International Search Report and Written Opinion—PCT/US2017/052773—ISA/EPO—dated Nov. 17, 2017.

* cited by examiner

DEPTH-BASED ZOOM FUNCTION USING MULTIPLE CAMERAS

BACKGROUND

Field

The systems and methods disclosed herein are directed to image processing, and, more particularly, to generating images using multi camera devices.

Description of the Related Art

Some imaging devices use two or more cameras to implement a zoom function. In these devices, each camera includes its own associated circuitry, lens, and sensors. Accordingly, the output of these cameras, even when imaging the same scene, can differ in image parameters, for example in field of view and color. Depending on the zoom command received from a user's input, the imaging device can activate an appropriate camera and direct its output to an image preview screen. However, when the imaging device switches the active camera, a user can undesirably perceive a sudden change in the preview screen while composing an image scene in the preview mode of the imaging device. Consequently, systems and methods are needed to implement a zoom function where a user can compose an image scene and can input zoom commands without perceiving an undesirable shift in the preview mode of the imaging device when the imaging device switches between the active cameras.

SUMMARY

The industry trend in the mobile space is toward inclusion of multiple cameras on smart phones which enables image quality improvements through the use of computational photography techniques. In applications having multiple cameras, a transformation may need to be computed between the cameras so that the transition from images captured by one camera to images captured by another camera is seamless. However, a global transformation that does not take into account the depth information associated with the objects in the images may result in a distorted image due to parallax. Thus, an improved method of transforming pixels in an image captured by one camera such that the pixels match the corresponding pixels in another image captured by another camera is desired.

In some embodiments of the present disclosure, an improved camera system having multiple cameras is provided. The multiple cameras may include a pair of stereoscopic image sensors. In some cases, each of the multiple cameras may be designed for capturing images in a different condition. For example, the camera system may include a wide angle camera and a telephoto camera. In such an example, the wide angle camera may be juxtaposed with the telephoto camera for achieving optical zoom.

An error-free transformation to and from each of the multiple cameras may be computed by using depth information calculated based on captured images and/or employing depth information at the user- or machine-determined region of interest (ROI), thereby eliminating distortion from the resulting image. The depth information may be derived from a depth map generated based on the captured images. For example, the depth information at the user-specified or machine-determined ROI in the depth map may be used to improve the transform.

For example, the camera system having a first camera and a second camera may initially capture images using the first camera and switch to the second camera when a threshold condition is satisfied (e.g., the two cameras may be better-suited for capturing images in different conditions). In the example camera system having a wide angle camera and a telephoto camera, the wide angle camera may be used when the camera system is zoomed out and the telephoto camera may be used when the camera system is zoomed in. Spatial transform allows fusion of the second camera into the first camera so that the captured image appears to be smooth and without distortions during the transition from the first camera to the second camera.

The systems, methods and devices of this disclosure each have several innovative aspects, no single one of which is solely responsible for the desirable attributes disclosed herein.

In one aspect, a multi-camera device comprises a first camera, a second camera, a display, a memory, and one or more processors coupled to the memory. The one or more processors may be configured to: retrieve a first image from the memory; retrieve a second image from the memory; determine a spatial transform based at least in part on depth information associated with one or more individual pixels in at least one of the retrieved first and second images, the spatial transform including information configured to spatially align pixels of the first image and corresponding pixels of the second image; receive input to transition from a current preview zoom level to a next preview zoom level; determine whether the next preview zoom level satisfies a handover condition for switching from the first camera to the second camera; modify the second image using the spatial transform based on the next preview zoom level; and cause preview images to be provided on the display, the preview images comprising the first image and the modified second image, wherein the modified second image is to be provided on the display based on the next preview zoom level immediately after the first image is provided on the display based on the current preview zoom level.

The multi-camera device of the preceding paragraph can have any sub-combination of the following features: where the one or more processors are further configured to generate the depth information based on the at least one of the retrieved first and second images; where the one or more processors are further configured to determine the spatial transform based on the depth information corresponding to all pixel positions within the first or second image; where the one or more processors are further configured to determine a region of interest (ROI) with respect to a first preview image provided on the display, determine ROI-specific depth information corresponding to pixel positions in the ROI but not to other pixel positions outside the ROI, and determine the spatial transform based on the ROI-specific depth information such that the spatial transform reduces a difference in pixel values in the ROI between the first image and the modified second image with respect to the spatial transform determined based on the depth information corresponding to all pixel positions within the first or second image; where the difference in the pixel values in the ROI between the first image and the modified second image is zero; where the one or more processors are further configured to generate the depth information for the ROI and not for regions outside the ROI; where the one or more processors are further configured to determine the ROI based on a touch input received via a touch screen of the multi-camera device; where the one or more processors are further configured to automatically detect the ROI using an auto-focus feature of the multi-camera device; where the first camera comprises a wide-angle lens and the second camera comprises a telephoto lens; where the one or more processors are further configured to switch the second camera from an OFF state to an ON state while the first camera is in an ON state and prior to reaching the next zoom level satisfying the handover condition; and where the one or more processors are further configured to switch the first camera from an ON state to an OFF state while the second camera is in the ON state and subsequent to reaching the next zoom level satisfying the handover condition.

In another aspect, a method for displaying preview images may comprise: receiving one or more first images captured by a first camera having a first field-of-view (FOV); receiving one or more second images captured by a second camera having a second FOV that is different than the first FOV; determining a spatial transform based at least in part on depth information associated with one or more individual pixels in at least one of the first and second images, the spatial transform including information configured to spatially align pixels of the one or more first images and corresponding pixels of the one or more second images; receiving input to transition from a current preview zoom level to a next preview zoom level; determining whether the next preview zoom level satisfies a handover condition for switching from the first camera to the second camera; modifying the second image using the spatial transform based on the next preview zoom level; and displaying preview images comprising the first image and the modified second image, wherein the modified second image is displayed based on the next preview zoom level immediately after the first image is provided on the display based on the current preview zoom level.

The method of the preceding paragraph can have any sub-combination of the following features: where the method further comprises generating the depth information based on the at least one of the retrieved first and second images; where the method further comprises determining the spatial transform based on the depth information corresponding to all pixel positions within the first or second image; where the method further comprises determining a region of interest (ROI) with respect to a first preview image, determining ROI-specific depth information corresponding to pixel positions in the ROI but not to other pixel positions outside the ROI, and determining the spatial transform based on the ROI-specific depth information such that the spatial transform reduces a difference in pixel values in the ROI between the first image and the modified second image with respect to the spatial transform determined based on the depth information corresponding to all pixel positions within the first or second image; where the difference in the pixel values in the ROI between the first image and the modified second image is zero; where the method further comprises generating the depth information for the ROI and not for regions outside the ROI; where the method further comprises determining the ROI based on a touch input received via a touch screen of the multi-camera device; where the method further comprises automatically detecting the ROI using an auto-focus feature of the multi-camera device; where the first camera comprises a wide-angle lens and the second camera comprises a telephoto lens; where the method further comprises switching the second camera from an OFF state to an ON state while the first camera is in an ON state and prior to reaching the next zoom level satisfying the handover condition; and where the method further comprises switching the first camera from an ON state to an OFF state while the second camera is in the ON state and subsequent to reaching the next zoom level satisfying the handover condition.

In another aspect, non-transitory physical computer storage may comprise code configured to cause display of preview images. The code, when executed, may cause an apparatus to: receive one or more first images captured by a first camera having a first field-of-view (FOV); receive one or more second images captured by a second camera having a second FOV that is different than the first FOV; determine a spatial transform based at least in part on depth information associated with one or more individual pixels in at least one of the first and second images, the spatial transform including information configured to spatially align pixels of the one or more first images and corresponding pixels of the one or more second images; receive input to transition from a current preview zoom level to a next preview zoom level; determine whether the next preview zoom level satisfies a handover condition for switching from the first camera to the second camera; modify the second image using the spatial transform based on the next preview zoom level; and display preview images comprising the first image and the modified second image, wherein the modified second image is displayed based on the next preview zoom level immediately after the first image is provided on the display based on the current preview zoom level.

The non-transitory physical computer storage of the preceding paragraph can have any sub-combination of the following features: where the code further causes the apparatus to generate the depth information based on the at least one of the retrieved first and second images; where the code further causes the apparatus to determine the spatial transform based on the depth information corresponding to all pixel positions within the first or second image; where the code further causes the apparatus to determine a region of interest (ROI) with respect to a first preview image, determine ROI-specific depth information corresponding to pixel positions in the ROI but not to other pixel positions outside the ROI, and determine the spatial transform based on the ROI-specific depth information such that the spatial transform reduces a difference in pixel values in the ROI between the first image and the modified second image with respect to the spatial transform determined based on the depth information corresponding to all pixel positions within the first or second image; where the difference in the pixel values in the ROI between the first image and the modified second image is zero; where the code further causes the apparatus to generate the depth information for the ROI and not for regions outside the ROI; where the code further causes the apparatus to determine the ROI based on a touch input received via a touch screen of the multi-camera device; where the code further causes the apparatus to automatically detect the ROI using an auto-focus feature of the multi-camera device; where the first camera comprises a wide-angle lens and the second camera comprises a telephoto lens; where the code further causes the apparatus to switch the second camera from an OFF state to an ON state while the first camera is in an ON state and prior to reaching the next zoom level satisfying the handover condition; and where the code further causes the apparatus to switch the first camera from an ON state to an OFF state while the second camera is in the ON state and subsequent to reaching the next zoom level satisfying the handover condition.

In another aspect, a multi-camera device may comprise: means for receiving one or more first images captured by a first camera having a first field-of-view (FOV); means for receiving one or more second images captured by a second camera having a second FOV that is different than the first FOV; means for determining a spatial transform based at least in part on depth information associated with one or more individual pixels in at least one of the first and second images, the spatial transform including information configured to spatially align pixels of the one or more first images and corresponding pixels of the one or more second images; means for receiving input to transition from a current preview zoom level to a next preview zoom level; means for determining whether the next preview zoom level satisfies a handover condition for switching from the first camera to the second camera; means for modifying the second image using the spatial transform based on the next preview zoom level; and means for displaying preview images comprising the first image and the modified second image, wherein the modified second image is displayed based on the next preview zoom level immediately after the first image is provided on the display based on the current preview zoom level.

The multi-camera device of the preceding paragraph can have any sub-combination of the following features: where the multi-camera device further comprises means for generating the depth information based on the at least one of the retrieved first and second images; where the multi-camera device further comprises means for determining the spatial transform based on the depth information corresponding to all pixel positions within the first or second image; where the multi-camera device further comprises means for determining a region of interest (ROI) with respect to a first preview image, means for determining ROI-specific depth information corresponding to pixel positions in the ROI but not to other pixel positions outside the ROI, and means for determining the spatial transform based on the ROI-specific depth information such that the spatial transform reduces a difference in pixel values in the ROI between the first image and the modified second image with respect to the spatial transform determined based on the depth information corresponding to all pixel positions within the first or second image; where the difference in the pixel values in the ROI between the first image and the modified second image is zero; where the multi-camera device further comprises means for generating the depth information for the ROI and not for regions outside the ROI; where the multi-camera device further comprises means for determining the ROI based on a touch input received via a touch screen of the multi-camera device; where the multi-camera device further comprises means for automatically detecting the ROI using an auto-focus feature of the multi-camera device; where the first camera comprises a wide-angle lens and the second camera comprises a telephoto lens; where the multi-camera device further comprises means for switching the second camera from an OFF state to an ON state while the first camera is in an ON state and prior to reaching the next zoom level satisfying the handover condition; and where the multi-camera device further comprises means for switching the first camera from an ON state to an OFF state while the second camera is in the ON state and subsequent to reaching the next zoom level satisfying the handover condition.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
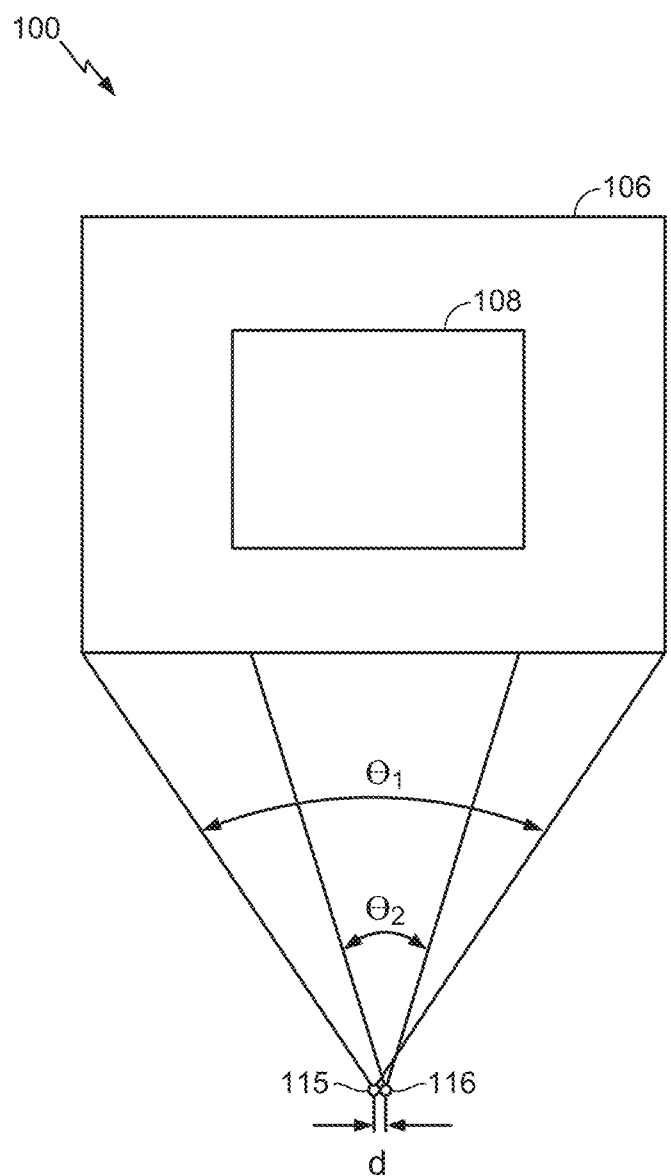
FIG. 1 illustrates an example of a diagram of different fields of view corresponding to different cameras or lenses of a multi-camera device.

Embodiments of the disclosure relate to systems and techniques for implementing an improved zoom function in a multi-camera device, for example, a device having two cameras. "Camera" as used herein refers to a set of image sensing components that typically include a sensor array (or "sensor") and one or more optical components (for example, one or more lenses or light re-directing components, sometimes referred to herein as "optics" or "set of optics") through which light from a target scene propagates before the light reaches the sensor array. In some embodiments, a multi-camera device may include multiple cameras, each including a set of optics and a corresponding sensor array. In other examples of devices with multiple cameras, a particular set of optics may correspond to two or more sensors, that is, provide light to two or more sensors. Some of the examples described herein describe a multi-camera device with asymmetric lenses/cameras, for example, a wide-angle camera and a telephoto camera, however, other examples of multi-camera devices are also contemplated, and this disclosure is not intended to be limited to the particular examples described. For example, the techniques described herein with reference to a wide-angle camera and a telephoto camera can be extended to any other combinations of cameras (e.g., to implement an improved zoom function while transitioning from any main camera or reference camera to any other auxiliary camera, and vice versa).

When viewing images generated by an imaging device having two or more cameras, switching between the cameras can cause undesirable image aberrations which may be perceived by a user viewing the images on a display. For example, the images generated by the two cameras for the same target scene may be different in spatial orientation and when the switch from displaying the images from one camera to displaying the images from the other camera occurs, the objects in the target scene may undergo a visible shift. Methods and systems of this disclosure address switching between cameras, for example, in a two-camera system where a first camera is configured to capture one type of images (e.g., wide angle images) of a target scene using one type of lens (e.g., a wide angle lens), and a second camera configured to capture another type of images (e.g., telephoto images) of the same target scene using another type of lens (e.g., a telephoto lens). Although techniques are described herein in the context of a two-camera system having a wide-angle camera and a telephoto camera, the embodiments of the present disclosure are not limited as such and may be extended to any other multi-camera systems having two or more cameras.

One desired characteristic of a multi-camera system is the ability to seamlessly switch from one camera view to the other camera view (e.g., from a wide-angle camera view to a telephoto camera view, or vice versa) of a target scene in response to a zoom-in or a zoom-out command. For example, the switch may not be perceived by a user, or such perception of the switch between cameras may be reduced or minimized.

With multiple cameras on an imaging apparatus, the images captured may be at different viewpoints due to the difference between the physical locations of the cameras. For example, the cameras may be separated by a distance of one (1) cm on the multi-camera device. To align the images such that when the images are viewed consecutively (e.g., one after the other), the differences that exist in the raw images are imperceptible by the user, the images may be spatially aligned, for example, by shifting the individual pixels to account for the difference in the physical locations of the cameras. In some examples, based on the distance to the object being viewed and/or the current preview zoom level, different images may be presented on the display (e.g., images from a wide-angle camera, images from a telephoto camera, fused images generated based on transforming the images from the wide-angle camera to match the images from the telephoto camera, or fused images generated based on transforming the images from the telephoto camera to match the images from the wide-angle camera).

In some embodiments, static calibration in the factory may be performed first, which includes identifying corresponding regions in both set of images and estimating transform function that maps the pixels from an image captured by one camera to pixels in the an image captured by another camera. For example, the static calibration described in U.S. patent application Ser. No. 15/017,898, filed Feb. 8, 2016 and titled "SYSTEMS AND METHODS FOR IMPLEMENTING SEAMLESS ZOOM FUNCTION USING MULTIPLE CAMERAS," which is incorporated herein by reference in its entirety, may be used. The calibration may include detecting keypoints in the two images being matched, matching the keypoints between the images, and estimating parameters of that matching to generate a spatial transform that defines a spatial relationship between corresponding pixels in images from the first camera and images from the second camera. The parameters for the spatial transform may include, for example, a scale shift, an angular rotation, or a shift in the horizontal or vertical direction. The transformation parameters can be adaptive. For example, the transformation parameters may be dynamically updated and re-stored for later use as additional images from the first camera and the second camera are spatially aligned.

Different Fields of View of Different Cameras

FIG. 1 illustrates an example of different fields of view corresponding to different cameras of a multi-camera device 100. In this example, the multi-camera device 100 includes a first camera 115 including a wide-angle lens, and a second camera 116 including a telephoto lens. The first camera 115 and the second camera 116 are positioned to both have a field-of-view (FOV) that includes the same target scene but each with a different angle of view of the target scene. In this example implementation, the first camera 115 (also referred to as wide-angle camera 115) has an angle of view $\theta_1$, and the second camera 116 (also referred to as telephoto camera 116) has an angle of view $\theta_2$. The angle of view $\theta_1$ for the wide-angle camera 115 is larger than the angle of view $\theta_2$ for the telephoto camera 116. Thus, the wide-angle camera 115 produces images with a "wider" field of view 106 compared to the telephoto camera 116 which produces images having a "narrower" field of view 108. As illustrated in FIG. 1, the wide-angle camera 115 of the multi-camera device 100 can be positioned a known distance "d" from the telephoto camera 116, as will be discussed further below.

In an example implementation, the first camera 115 is the main camera and has a wide angle lens, for example, having a focal length of 3.59 mm. The angle of the FOV of the first camera 115 is 67 degrees. The sensor of the first camera 116 includes an array of 4208 pixels along a length dimension, having 1.12 µm pixels, have a 4:3 aspect, and have autofocus functionality. In an example implementation, the second camera 116 is an auxiliary camera and has a telephoto lens having a focal length of 6 mm. In this example implementation, the angle of view of the second camera 116 is 34 degrees, and the sensor of the second camera 116 includes an array of 3208 pixels along a length dimension, having 1.12 µm pixels, has a 4:3 aspect, and also has auto-focus functionality.

Images captured by each camera of the multi-camera device 100 can be provided to a display device for viewing by a user. When the multi-camera device 100 is aimed at a target scene and receives a zoom-in command, the multi-camera device 100 may switch from the wide-angle camera 115 to the telephoto camera 116 while a user is previewing the target scene on a display and/or when images are being captured by the multi-camera device 100. Because a telephoto lens has a narrower field of view than a wide-angle lens and may have a different sensor and different imaging parameters, the user may perceive (and/or the video recorded by the multi-camera device 100 may include) a sudden undesirable change in preview images shown on the display. Similarly, a zoom-out command may cause the multi-camera device 100 to switch from the telephoto camera 116 to the wide-angle camera 116, and because a telephoto lens has a narrower field of view than a wide-angle lens, a perceptible sudden, undesirable change in the images maybe seen on the display device and/or captured in images captured by the multi-camera device 100.

Different Fields of View of Different Cameras

FIGS. 2A-2E illustrate an example of a multi-camera device 204 imaging a scene 202, where a display 203 of the multi-camera device 240 shows a preview of the scene 202 in response to zoom commands 212, according to some embodiments. In this example, the multi-camera device 204 includes a first camera having a wide-angle lens (wide-angle camera) 206 and a second camera having a telephoto lens (telephoto camera) 208. The illustrated multi-camera device 204 includes the display 203. The display 203 can be used to view images before they are captured and stored in memory (e.g., preview of the image to be captured), or images that are being captured and stored in memory (e.g., preview of the images captured). In FIGS. 2A-2E, region 205 denotes the field of view of the telephoto camera 208 while the region 210 denotes the field of view of the wide-angle camera 206. As the multi-camera device 204 processes a zoom-in command, the display 203 correspondingly shows a zoomed-in representation of the scene 202 as illustrated by FIGS. 2B-2E. Zoom slider 212 illustrates the current zoom level on the spectrum of available zoom levels.

Figure 2:
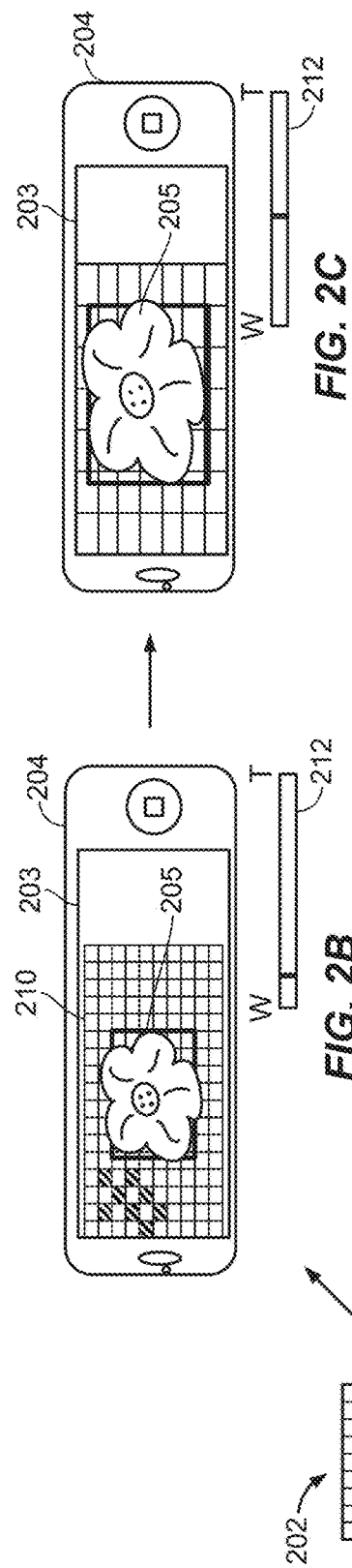
FIGS. 2A-2E illustrate an example of a two-camera device imaging a scene where a display shows a preview of the scene in response to zoom commands from a user, according to some embodiments.

FIG. 2B illustrates an example in which the current zoom level allows the images captured using the wide-angle camera 206 to be provided on the display 203. In FIG. 2B, the field of view of the telephoto camera 208 is denoted by region 205. The actual boundaries of the region 205 may be imperceptible (as displayed) to the user. In FIG. 2C, a received zoom-in command causes a more zoomed-in image to be displayed on the display 203 based on the images captured using the wide-angle camera 206. In FIG. 2D, a received zoom-in command causes the current zoom level to reach (or exceed) a switch threshold (also referred to herein as a handover threshold) at or beyond which point the multi-camera device 204 activates the telephoto camera 208 and causes a further zoomed-in image to be displayed on the display 203 based on the images captured using the telephoto camera 208. In FIG. 2D, preview image 214 displayed on the display 203 may be a fused or combined image generated based on the image(s) captured by the wide-angle camera 206 and the image(s) captured by the telephoto camera 208. For example, the preview image 214 may have been generated by applying a spatial transform to the individual pixels included in an image captured by the telephoto camera 208, where the spatial transform is configured to align the individual pixels included in the image captured by the telephoto camera 208 with corresponding pixels included in an image captured by the wide-angle camera 206. In some embodiments, the image captured by the telephoto camera 208 and the image captured by the wide-angle camera 206 have the same timestamp. The switch from the wide-angle camera 206 to the telephoto camera 208 may not be perceptible to the user viewing the preview image 214.

FIG. 2E illustrates an example in which the multi-camera device 204 has received yet another zoom-in command. Preview image 216 may have been generated by applying the same spatial transform previously determined based on the image captured by the telephoto camera 208 and the image captured by the wide-angle camera 206 to the individual pixels included in another image captured by the telephoto camera 208. Alternatively, the preview image 216 may have been generated by applying a new spatial transform to the individual pixels included in another image captured by the telephoto camera 208, where the new spatial transform is different from the previously determined spatial transform (e.g., FIG. 2D) and is configured to align the individual pixels included in an image captured by the telephoto camera 208 and corresponding to the preview image 216 with corresponding pixels included in an image captured by the wide-angle camera 206 and corresponding to the preview image 216.

The multi-camera device 204 may continue to receive zoom-in commands, and in response to such zoom-in commands, the multi-camera device 204 may provide further zoomed-in preview images on the display 203. Conversely, the multi-camera device 204 may receive a zoom-out command, and in response to such a zoom-out command, the multi-camera device 204 may provide zoomed-out preview images (e.g., from FIG. 2E to FIG. 2D, FIG. 2D to FIG. 2C, etc.).

If the spatial transform described herein is not performed, a user may see an abrupt change in the display 203 at or near the zoom level threshold (e.g., going from FIG. 2C and FIG. 2D or from FIG. 2D to FIG. 2C) for switching the source of the preview images displayed on the display 203 (e.g., from the wide-angle camera 206 to the telephoto camera 208, or vice versa). The fused image generated based on the spatial transform determined between the wide-angle camera 206 and the telephoto camera 208 may reduce, minimize, or eliminate the abrupt change perceptible to the user, and allow switching between the two cameras in a seamless manner unperceivable or nearly unperceivable to the user.

In some embodiments, preview images displayed while zooming in (or zooming out) may transition from (i) images captured by a first camera to (ii) images captured by a second camera and modified by the spatial transform (and the preview images while zooming out [or zooming in] may transition from [ii] to [i]). In other embodiments, preview images displayed while zooming in (or zooming out) may transition from (i) images captured by a first camera to (ii) images captured by a second camera and modified by the spatial transform, and then to (iii) images captured by the second camera that are not modified by the spatial transform (and the preview images while zooming out [or zooming in] may transition from [iii] to [ii] to [i]). Alternatively, preview images displayed while zooming in (or zooming out) may transition from (i) images captured by a first camera and modified by the spatial transform to (ii) images captured by a second camera that are not modified by the spatial transform (and the preview images while zooming out [or zooming in] may transition from [ii] to [i]). In yet another embodiment, preview images displayed while zooming in (or zooming out) may transition from (i) images captured by a first camera and not modified by the spatial transform to (ii) images captured by the first camera and modified by the spatial transform, and then to (iii) images captured by a second camera that are not modified by the spatial transform (and the preview images while zooming out [or zooming in] may transition from [iii] to [ii] to [i]).

Image Alignment based on Keypoints

As discussed above, the images produced by the wide-angle camera 206 and telephoto camera 208 can be different in spatial alignment. In some embodiments, spatial alignment matching or equalization can be performed to produce a smooth transition of images from the wide-angle camera 206 to the telephoto camera 208, or vice versa. Image alignment functionality may include image spatial alignment along with intensity equalization in region matching for image alignment. Each image in a set of images can depict substantially the same image scene, for example from different viewpoints, in different lighting, or in different portions of the electromagnetic spectrum. Each of the images in the set can be divided into a number of regions including blocks of pixels. The regions can be matched to determine regions depicting corresponding features between the images, that is, to determine which regions in the images depict the same feature. The regions depicting corresponding features can be matched spatially and as to intensity. The spatial or intensity correspondence between regions depicting corresponding features can permit accurate matching using the regions, leading, for example, to accurate downstream image alignment and/or depth map construction.

In some embodiments, the regions can be determined at least partly based on identifying distinctive features, referred to as keypoints, in each image in the set of images. Keypoints may be selected and/or processed such that the keypoints are invariant to image scale changes and/or rotation and provide robust matching across a substantial range of distortions, changes in points of view, and/or noise. The region location, shape, and size can be determined based, for example, on the location, shape, and size of the extracted features. Spatial and/or intensity equalization between corresponding regions can adapt to local structure content such as the shape of keypoints. Accordingly, the effects of spatial and/or intensity variations on keypoint matching can be mitigated or eliminated by region matching and/or equalizing intensity of corresponding regions after keypoint detection.

Multi-Camera Device

Figure 3:
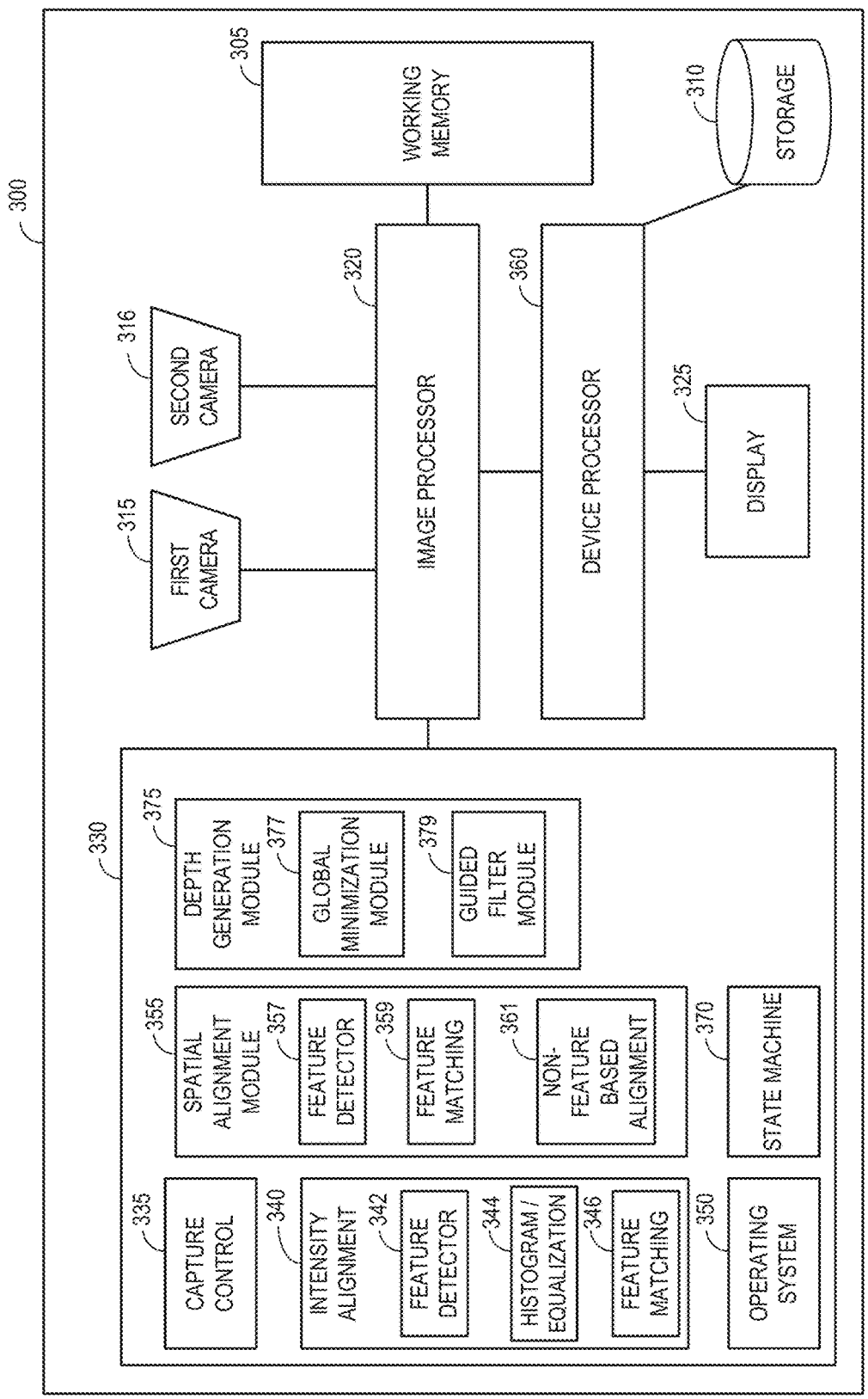
FIG. 3 is a block diagram illustrating an example of an embodiment of a multi-camera device having depth-based zoom capability.

FIG. 3 is a block diagram illustrating an example of an embodiment of a multi-camera device 300 having an improved zoom capability. In this example, the multi-camera device 300 includes an image processor 320 coupled to two or more cameras (e.g., a first camera 315 and a second camera 316). The multi-camera device 300 also may include a working memory 305, storage 310, a display 325, and a memory 330, all coupled to and in communication with the image processor 320. In some embodiments including the illustrated embodiment in FIG. 3, components of the multi-camera device 300 including the display 325 and storage 310 may be coupled to and/or in communication with the image processor 320 via a device processor 360. In this example, the memory 330 includes modules having instructions to configure the image processor 320 to perform various operations including the improved zoom functionality described herein. In some embodiments, one or more components of the multi-camera device 300 may be implemented by one or more hardware processors configured to execute software code configured to perform the tasks of such components. In other embodiments, one or more components of the multi-camera device 300 may be implemented by hardware circuitry configured to perform the tasks of such components.

In various embodiments, the multi-camera device 300 may be a cell phone, digital camera, smartphone, tablet computer, personal digital assistant, or the like. A plurality of imaging applications may be available to the user of the multi-camera device 300 on the multi-camera device 300. These applications may include traditional photo and video applications, high dynamic range imaging, panoramic photo and video, stereoscopic imaging such as 3D images or 3D video, or multispectral imaging, etc. The multi-camera device 300 as illustrated includes the first camera 315 and second camera 316 for capturing external images. The first camera 315 and second camera 316 may each include various components that are not explicitly shown in FIG. 3 for clarity, including for example a sensor, a lens assembly, and autofocus module. The first camera 315 and second camera 316 may be charge coupled devices (CCD) or complementary metal oxide semiconductors (CMOS) in some embodiments. The first camera 315 and second camera 316 are configured with different components (for example, optics, sensors) and thus produce images that are formed based on their own particular optics and sensor. Thus, the target image scene may be captured as a set of images in which the first camera 315 captures an image A according to the intensity response of the sensor in the first camera 315, and the second camera 316 captures an image B according to the intensity response of the sensor in the second camera 316. Additionally, the captured images A and B can differ in spatial alignment, for example, due to the physical offset between the cameras, roll, pitch, and yaw between the cameras or lenses in sensor assemblies A and B. Although two cameras are shown (i.e., first camera 315 and second camera 316) for purposes of illustration, the embodiments of the present disclosure are not intended to be limited as such, and the techniques described herein can be extended to other types of multi-camera systems. In other embodiments, three or more cameras can capture a set of images of a target scene, the set of images exhibiting at least some spatial misalignment. In still other embodiments, a single camera can capture a set of images of a target scene, the set of images exhibiting at least spatial misalignment. In some embodiments, one or more of the cameras may not be part of the multi-camera device 300, instead information from one or more cameras is provided to the multi-camera device 300 for processing. For example, the cameras may be part of another imaging system, and information from such a system may be provided to be processed using functionality described for the multi-camera device 300. In some embodiments, such information is first stored, and then provided to the multi-camera device 300 for processing. The number of sensor assemblies may be increased or decreased according to the needs of the imaging system 300. The first camera 315 and second camera 316 may be coupled to the image processor 320 to transmit captured images to the image processor 320.

The image processor 320 may be configured to perform various processing operations on received image data including a number of images of the image scene in order to output an accurately aligned image set, as will be described in more detail below. Image processor 320 may be a general purpose processor or a processor specially designed for imaging applications. Examples of image processing operations include cropping, scaling (e.g., to a different resolution), image stitching, image format conversion, color interpolation, color processing, image filtering (e.g., spatial image filtering), lens artifact or defect correction, etc. Image processor 320 may, in some embodiments, comprise a plurality of processors. Certain embodiments may have a processor dedicated to each image sensor. Image processor 320 may be one or more dedicated image signal processors (ISPs) or a software implementation of a processor.

Image processor 320 may be connected to a memory 330 and a working memory 305. In the illustrated example, the memory 330 stores capture control module 335, intensity alignment module 340, spatial alignment module 355, depth generation module 375 state machine module 370, and operating system module 350. These modules include instructions that configure the image processor 320 and/or device processor 360 to perform various image processing and device management tasks. Working memory 305 may be used by image processor 320 to store a working set of processor instructions contained in the modules of memory 330. Alternatively, working memory 305 may be used by image processor 320 to store dynamic data created during the operation of multi-camera device 300.

As described above, the image processor 320 may be configured, or controlled, by several modules stored in the memory of the multi-camera device 300 (e.g., memory 330). The capture control module 335 may include instructions that configure the image processor 320 to adjust the focus position of first camera 315 and second camera 316. Capture control module 335 may further include instructions that control the overall image capture functions of the multi-camera device 300. For example, capture control module 335 may include instructions that call subroutines to configure the image processor 320 to capture raw image data of a target image scene using the first camera 315 and second camera 316. Capture control module 335 may then call the spatial alignment module 355 and/or intensity alignment module 340 to perform spatial alignment and/or local intensity equalization on the images captured by the first camera 315 and second camera 316, and to output aligned image data to image processor 320. Capture control module 335 may also call the spatial alignment module 355 and/or intensity alignment module 340 to perform spatial alignment and/or intensity equalization on raw image data in order to output a preview image on display 325 of a scene captured or to be captured in some embodiments, and to update the preview image at certain time intervals or when the scene in the raw image data changes.

Spatial Alignment Module

Spatial alignment module 355 may include instructions that configure the image processor 320 to perform spatial alignment on captured image data. For example, each of the first camera 315 and second camera 316 may capture an image depicting the target scene according to each camera's different parameters and characteristics. As discussed above, images capturing the same target scene generated by the first camera 315 and second camera 316 may differ due to discrepancies in sensor gains, roll-offs, pitch, yaw, sensitivity, field of view, white balance, geometric distortion, and noise sensitivities, differences between the lenses in the first camera 315 and the second camera 316, and on-board image signal conditioning. In order to perform accurate spatial alignment of the images, spatial alignment module 355 may configure the image processor 320 to detect corresponding features between the images from the first camera 315 and second camera 316, estimate an appropriate transformation (or mapping between the corresponding regions) and perform region matching producing images which can be accurately juxtaposed on top of each other. Additionally, the spatial alignment module 355 may configure the image processor 320 to align the two images even when corresponding features between images cannot be detected.

Spatial alignment module 355 can include feature detector 357 including instructions that configure the image processor 320 to detect distinctive features, or keypoints, in the image data. Such features can correspond to points in the images that can be matched with a high degree of accuracy. For example, distinctive features may be characterized at least partly by the presence or sharpness of edges or lines, corners, ridges, or blobs differing in properties, for example, size, shape, dimension, brightness or color compared to surrounding pixel regions. Generally, object or feature recognition may involve identifying points of interest (also called keypoints) in an image and/or localized features around those keypoints for the purpose of feature identification. An object or feature may be characterized by descriptors identifying one or more keypoints. Keypoints can be identified by any known feature detection technique, e.g., sum of squared differences, Laplacian of Gaussian (LoG), difference of Gaussian (DoG), and determinant of the Hessian (DoH), to name a few.

Feature detector 357 can also include instructions that configure the image processor 320 to partition the image data into regions including pixel blocks based at least partly on the identified keypoints. The pixel block location, shape, and size can be determined based, for example, on the location, shape, and size of the identified keypoints. In some embodiments such as some stereoscopic alignment applications, the feature detector 357 can include instructions that configure the image processor 320 to limit pixel block size to larger than a disparity value and/or smaller than a roll-off variation value.

Spatial alignment module 355 can also include a matching module 359, which includes instructions that configure the processor 320 to estimate and apply one or more transformations to match the corresponding regions of one or more images generated by the first camera 315 and the second camera 316.

Depth Generation Module

Depth generation module 375 may include a global minimization module 377 and a guided filter module 379. The global minimization module 377 may include instructions that configure the image processor 320 or the device processor 360 to generate a depth map based on a stereo image pair. The stereo image pair may include two images captured simultaneously by two different cameras of the multi-camera device. Such images may show the same scene but from slightly different angles. This depth map may be generated using a global minimization technique, such as an iterative technique described in U.S. patent application Ser. No. 14/631,681, filed Feb. 25, 2015 and titled "SYSTEMS AND METHODS FOR STEREO DEPTH ESTIMATION USING GLOBAL MINIMIZATION AND DEPTH INTERPOLATION," which is incorporated herein by reference in its entirety. The global minimization module 377 may also contain instructions for downsampling an image. For example, a number of different downsampled versions of the images making up the stereo image pair may be used to construct depth maps of increasingly large sizes. These downsampled images may be generated by the image processor 320 or the device processor 360, using instructions from the global minimization module 377.

Figure 9:
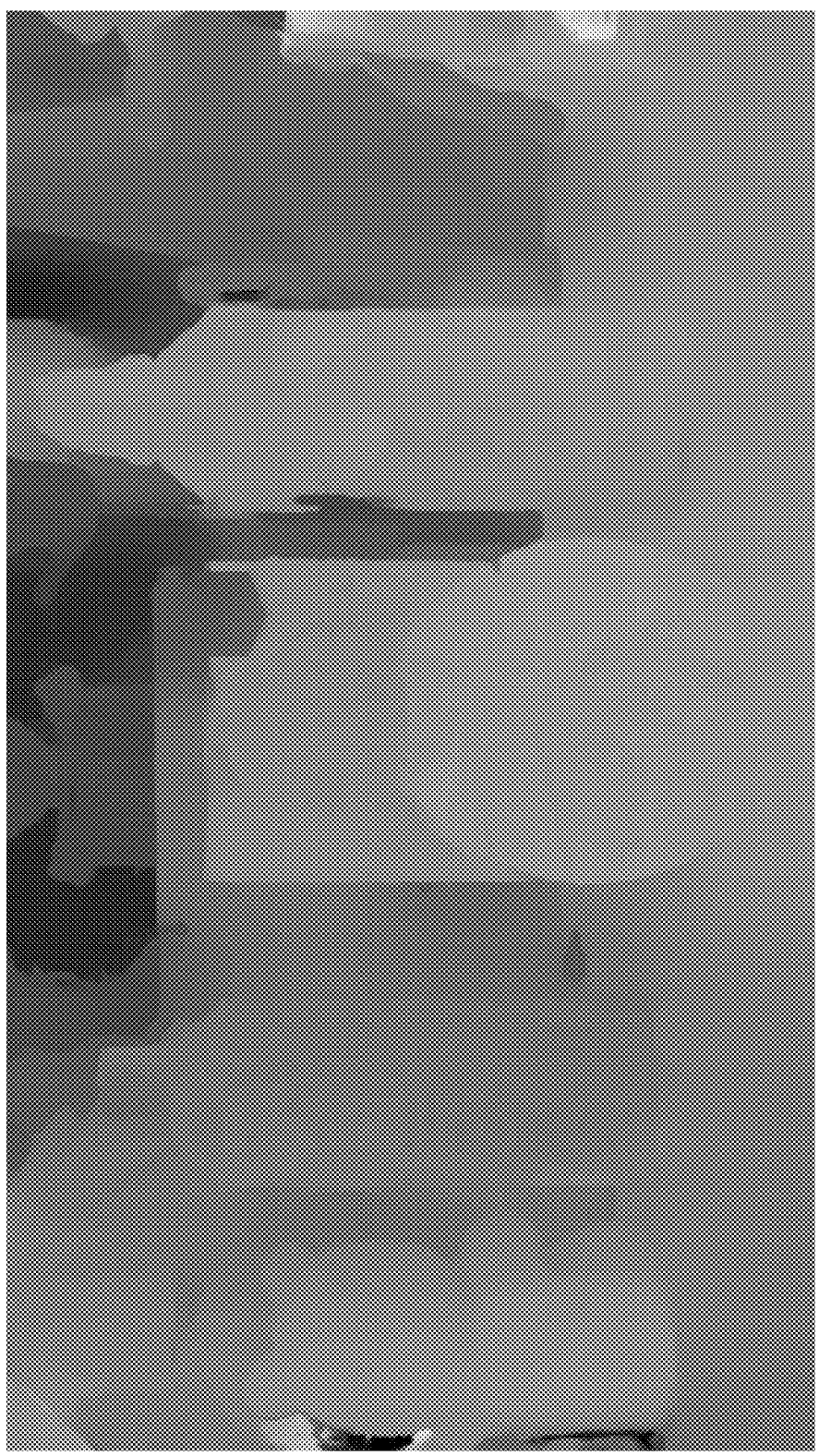
FIG. 9 illustrates a depth map generated by a multi-camera device, according to some embodiments.

Guided filter module 379 may comprise instructions that configure the image processor 320 or the device processor 360 to use an image, such as one of the reference images in the stereo image pair, to sharpen the edges of an upscaled depth map. In some aspects, the guided filter module 379 may further comprise instructions for upsampling a depth map, such as through bilinear interpolation. For example, the guided filter module may receive a depth map generated by the global minimization module 377, and may upsample this depth map to match a resolution of one of the reference images in the stereo image pair. A sample depth map is shown in FIG. 9.

Intensity Alignment Module

Intensity alignment module 340 may include instructions that configure the image processor 320 to perform image intensity alignment (which also may be referred to photometric alignment) using local intensity equalization techniques on captured image data. For example, each of the first camera 315 and second camera 316 may capture an image depicting the target scene according to each respective sensor's intensity response. As discussed above, the intensity responses may differ due to discrepancies in sensor gains, roll-offs, sensitivity, field of view, white balance, geometric distortion, and noise sensitivities, among other things, due to differences in the lenses and/or sensors first camera 315 and second camera 316, and on-board image signal conditioning. In order to perform accurate intensity alignment of the images despite local intensity variations between the images, intensity alignment module 340 may configure the image processor 320 to partition the images into a number of regions, equalize local intensity values of corresponding regions, and perform region matching using the intensity-equalized regions.

For instance, intensity alignment module 340 can include feature detector 342 including instructions that configure the image processor 320 to detect distinctive features, or keypoints, in the image data. Such features can correspond to points in the images that can be matched with a high degree of accuracy. For example, distinctive features may be characterized at least partly by the presence or sharpness of edges or lines, corners, ridges, or blobs differing in properties, for example, size, shape, dimension, brightness or color compared to surrounding pixel regions. Generally, object or feature recognition may involve identifying points of interest (also called keypoints) in an image and/or localized features around those keypoints for the purpose of feature identification. An object or feature may be characterized by descriptors identifying one or more keypoints. Keypoints can be identified by any known feature detection technique, e.g., sum of squared differences, Laplacian of Gaussian (LoG), difference of Gaussian (DoG), and determinant of the Hessian (DoH), to name a few.

Feature detector 342 can also include instructions that configure the image processor 320 to partition the image data into regions including pixel blocks based at least partly on the identified keypoints. The pixel block location, shape, and size can be determined based, for example, on the location, shape, and size of the identified keypoints. In some embodiments such as some stereoscopic alignment applications, the feature detector 342 can include instructions that configure the image processor 320 to limit pixel block size to larger than a disparity value and/or smaller than a roll-off variation value.

Intensity alignment module 340 can also include histogram module 344, which includes instructions that configure the processor 320 to generate and analyze histograms of the regions and generate an intensity equalization function based at least partly on the histogram analysis. Histogram module 344 can include instructions that configure the processor 320 to determine the probability mass function (PMF) of each block, to sum the mass in the PMF to compute the cumulative mass function (CMF), and to use the CMF to map intensity values from pixels in the image captured by first camera 315 to pixels in the image captured by second camera 316 (or vice versa). Accordingly, the intensity equalization between corresponding regions can adapt to local structure content such as the shape of keypoints.

Intensity alignment module 340 can also include matching module 346, which includes instructions that configure the processor 320 to perform region matching using the intensity-equalized image data generated by the histogram module 344. Due to the local adaptive intensity equalization, the corresponding keypoint regions may look very similar to one another in terms of intensity values, enabling highly accurate matching around the keypoint structures, even in images exhibiting spatially varying intensity.

State Machine Module

State machine module 370 may configure the image processor 320 and/or the device processor 360 to turn the first and second cameras 315 and 316 on and off, to take image feeds from the first and second cameras 315 and 316, to show on a display portions or all of the images from the first and second cameras 315 and 316, etc. The resulting state as dictated by the state machine 370 may cause image transformation parameters to be stored, or retrieved from storage, that may be used to reapply the transformation parameters or the inverse of the transformation depending on the zoom command input by a user of the multi-camera device 300.

Operating System Module

Operating system module 350 may configure the image processor 320 to manage the working memory 305 and the processing resources of multi-camera device 300 for various operational tasks. For example, operating system module 350 may include device drivers to manage hardware resources such as the first camera 315 and second camera 316. Therefore, in some embodiments, instructions contained in the image processing modules discussed above may not interact with these hardware resources directly, but instead interact through standard subroutines or application programming interfaces (APIs) located in operating system module 350. Instructions within operating system module 350 may then interact directly with these hardware components. Operating system module 350 may further configure the image processor 320 to share information with device processor 360.

Device Processor

Device processor 360 may be configured to control the display 325 to display the captured image, or a preview of the captured image or an image to be captured, to a user. The display 325 may be external to the multi-camera device 300 or may be part of the multi-camera device 300. The display 325 may also be configured to provide a view finder displaying a preview image for use prior to capturing an image, or may be configured to display a captured image stored in memory or recently captured by the user. The display 325 may comprise an LCD or LED screen, and may implement touch sensitive technologies.

Storage Module

Device processor 360 may write data to storage module 310, for example data representing captured images, image alignment data, intensity value data, and the like. While storage module 310 is represented graphically as a traditional disk device, those with skill in the art would understand that the storage module 310 may be configured as any storage media device. For example, the storage module 310 may include a disk drive, such as a floppy disk drive, hard disk drive, optical disk drive or magneto-optical disk drive, or a solid state memory such as a FLASH memory, RAM, ROM, and/or EEPROM. The storage module 310 can also include multiple memory units, and any one of the memory units may be configured to be within the multi-camera device 300, or may be external to the multi-camera device 300. For example, the storage module 310 may include a ROM memory containing system program instructions stored within the multi-camera device 300. The storage module 310 may also include memory cards or high speed memories configured to store captured images which may be removable from the camera.

Variations to Multi-Camera Device

Although FIG. 3 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance. Additionally, although FIG. 3 illustrates two memory components, including memory component 330 including several modules and a separate working memory 305, other embodiments may utilize different memory architectures. For example, a design may utilize ROM or static RAM memory for the storage of processor instructions implementing the modules contained in memory 330. The processor instructions may be loaded into RAM to facilitate execution by the image processor 320. For example, working memory 305 may comprise RAM memory, with instructions loaded into working memory 305 before execution by the processor 320.

Depth-Based Zoom

Figure 4:
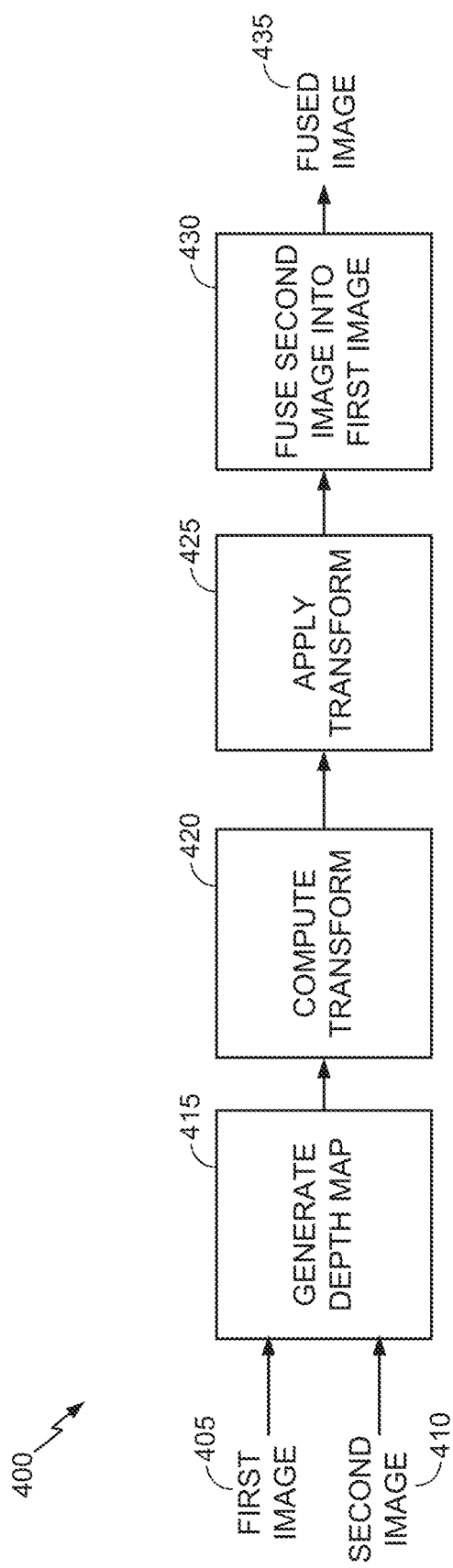
FIG. 4 is a block diagram illustrating a process to seamlessly display a first image from a first camera of a multi-camera device and a second image from a second camera of the multi-camera device, according to some embodiments.

FIG. 4 is a block diagram illustrating a process 400 to seamlessly display a first image from a first camera of a multi-camera device and a second image from a second camera of the multi-camera device, according to some embodiments. For example, such a process may be performed during a zoom-in or a zoom-out of the preview image displayed on the display screen of the multi-camera device. In such a process, the images from the multiple cameras are processed and presented such that the transition among the multiple cameras is not perceivable by a user of the multi-camera device, despite each camera having different imaging characteristics. In the example of FIG. 4, the multi-camera device has two cameras. In other examples, the multi-camera device can have three or more cameras. Each of the illustrated blocks of process 400 is further described herein.

First image 405 from a first camera and second image 410 from a second camera are received, and a depth map is generated at block 415. Although referred to for convenience as first image 405 and second image 410, the first image 405 may also refer to a series of images from the first camera of the multi-camera device. Such series of images may include still images or a series of images captured as video. Similarly, the second image 410 may also refer to a series of images from the second camera of the multi-camera device. Such series of images may include still images or a series of images captured as video.

In some embodiments, the generated depth map includes depth information (e.g., a depth index) for each pixel position in the first image 405 and/or the second image 410. In other embodiments, the generated depth map includes depth information for a subset of pixel positions in the first image 405 and/or the second image 410 but not all pixel positions in the first image 405 and/or the second image 410. For example, the depth information may be generated only for a region of interest (ROI) specified by the user or an ROI automatically detected by the multi-camera device. The ROI may be specified by a touch input received via a touchscreen of the multi-camera device. In some embodiments, upon receiving an indication of the ROI (or determining the ROI without user input), the multi-camera device generates a depth map for a predetermined number of pixel positions in the ROI and/or near the ROI. For example, the depth map may be generated for pixel positions within a rectangular region having a specific dimension and surrounding the ROI. Other depth map generation techniques may also be used, such as those described in U.S. patent application Ser. No. 14/631,681, filed Feb. 25, 2015 and titled "SYSTEMS AND METHODS FOR STEREO DEPTH ESTIMATION USING GLOBAL MINIMIZATION AND DEPTH INTERPOLATION," which is incorporated herein by reference in its entirety.

At block 420, the multi-camera device determines the transform based on the depth map generated at block 415. For example, if an object in the target scene is far away from the multi-camera device, the shift in parallax (e.g., between the wide-angle camera and the telephoto camera) may be smaller than another object in the target scene that is close to the multi-camera device. In some embodiments, a target scene may contain multiple objects, each having different depths (e.g., distance from the cameras). In such embodiments, if the distribution of the objects is not taken into account, the switch from the wide-angle camera to the telephoto camera may not be smooth and become noticeable by the user operating the multi-camera device. For example, when the multi-camera device switches from generating preview images based on images captured by the wide-angle camera to generating preview images based on images captured by the telephoto camera under the assumption that the objects all have the same distance from the cameras (e.g., depth of the center object in the target scene), the center object may be correctly rendered, but objects in the foreground and background may result in a wobbly shift because such objects are located at distances different from where the transform was estimated.

The transform may be configured to cause pixels in the second image 410 to be spatially aligned with corresponding pixels in the first image 405. In some embodiments, due to the difference in the physical locations of the first and second cameras on the multi-camera device, the same target object shown in both the first image 405 and the second image 410 may not have the same spatial position within the respective images. For example, a red pixel at (15,15) of the first image 405 may illustrate the same portion of the target scene as the red pixel at (12,15) of the second image 410. In some embodiments, the multi-camera device may determine the depth index associated with the position (12,15) or (15,15), and determine a pixel shift to be performed for the red pixel at (12,15) of the second image 410 based on the determined depth index. For example, the determined pixel shift may be (−3,0), which would cause the red pixel to have a position identical to the position of the corresponding red pixel in the first image 405. In some cases, the determined pixel shift may not cause the shifted pixel to have a position identical to the position of the corresponding pixel in the first image 405, but may cause the shifted pixel to have a position closer to the position of the corresponding pixel in the first image 405 than the original position prior to shifting. In some embodiments, the absolute value of the shift amount may be inversely proportional to the depth index (in a case that a greater depth index indicates that the object is farther away from the camera).

In some embodiments, the spatial transformation according to the determined transform is different for each pixel in the image being transformed (e.g., second image 410). If each pixel is shifted by an appropriate amount, such that when the multi-camera device performs the switch, all the pixels in the second image 410 pick up where the corresponding pixels in the first image 405 left off, the switch is transparent to or imperceptible by the user viewing the preview images displayed by the multi-camera device. In such an example, when the multi-camera device is zooming in, the transform may cause the current frame of the telephoto camera to look exactly the same as the previous frame of the wide-angle camera (and vice versa, if zooming out).

Once the transform is determined at block 420, the determined transform is applied to the second image 410 at block 425. The transform may cause the second image 410 to be visually identical to or indistinguishable from the first image 405. In another example, the transform may cause the second image 410 to be visually identical to or indistinguishable from a portion (but not all) of the first image 405. After the transform is applied, the transformed second image 410 may be fused into the first image 405 to generate the fused image 430 to further eliminate any differences between the first image 405 and the transformed second image 410 (e.g., to supplement portions of the target scene not covered by the first or second image, to reduce noise in the transformed image, etc.). For example, the fused image 430 may include a portion of the first image 405 and a portion of the (transformed) second image 410. The fused image 430 may be displayed via the display screen of the multi-camera device.

Other techniques for static calibration, spatial alignment, photometric alignment, intensity alignment, and/or camera activation based on state machines described in U.S. patent application Ser. No. 15/017,898, filed Feb. 8, 2016 and titled "SYSTEMS AND METHODS FOR IMPLEMENTING SEAMLESS ZOOM FUNCTION USING MULTIPLE CAMERAS," which is incorporated herein by reference in its entirety, may be used.

Improved Zoom Providing Smooth Transitions

The improved zoom feature described herein allows the handoff from one camera to another while zooming in or zooming out to be essentially imperceptible (e.g., unnoticeable by the user operating the multi-camera device). For example, the user may be trying to take a picture or may be recording a video, and the user zooms in on a target object. The preview images displayed to the user may be based on images captured by one of the multiple cameras (e.g., wide-angle camera). As the user continues to zoom in on the target object, the current zoom level may reach a point at which switching from the wide-angle camera to the telephoto camera becomes desirable.

For example, the images captured by the telephoto camera include more pixels per unit area in the target scene, but the telephoto camera has a much narrower FOV than the wide-angle camera. Thus, when the multi-camera device is zoomed out and needs to cover a wide FOV, the wide-angle camera may be more desirable for generating the preview images and/or capturing the images. However, once the current zoom level allows the preview images to be generated based solely (or mostly) on the images captured by the telephoto camera, the telephoto camera may be more desirable for generating the preview images and/or capturing the images. The telephoto images allow higher quality preview images to be provided even when the multi-camera device is zoomed in on a relatively small area, allowing the multi-camera to mimic an optical zoom. In some embodiments, the improved zoom function described herein is performed without upsampling the images captured by the wide-angle camera or the telephoto camera.

User-Selected Region of Interest

The multi-camera device may be configured to receive a touch input via a touch-sensitive screen provided on the multi-camera device while preview images are being displayed via the touch-sensitive screen. The position on the touch-sensitive screen at which the touch input is received may be indicative of the object in the target scene captured by the multi-camera device in which the user (e.g., the operator of the multi-camera device) is interested. For example, if the user taps the center of the touch-sensitive screen where a dog is playing, the multi-camera device may determine that the user is interested in the object appearing in the center of the screen (e.g., the dog). If the user performs a pinch-in gesture on the screen to zoom in on the dog shown on the screen, and the pinch-in gesture causes the zoom level of the multi-camera device to reach a handover threshold (e.g., a point at which switching from one camera to another becomes desirable), then, based on the user's indication of his or her region of interest (e.g., by tapping on the screen prior to zooming in on his or her object of interest), the multi-camera device may determine a transform that causes the spatial transformation at or near the region of interest to be perfect (e.g., the transform causes every pixel at or near the region of interest to be aligned) or more accurate than other areas within the preview images (e.g., the distortion at or near the region of interest is lower than in other areas of the preview images). In some embodiments, the region of interest is automatically detected by the multi-camera device and is not based on a touch input from the user. For example, the region of interest may be a portion of the target scene at which the multi-camera device is autofocused.

Figure 5:
FIG. 5 illustrates an image generated by a wide-angle camera, according to some embodiments.
Figure 6:
FIG. 6 illustrates an image generated by a telephoto camera and having the same region of interest as the image illustrated in FIG. 5, according to some embodiments.

FIGS. 5 and 6 illustrate an example of the improved zoom feature based on a region of interest. FIG. 5 illustrates an image 500 generated by a wide-angle camera. FIG. 6 illustrates an image 600 generated by a telephoto camera and having the same region of interest as the image illustrated in FIG. 5. In some embodiments, FIGS. 5 and 6 may illustrate preview images that are consecutively displayed on the display screen of the multi-camera device. As shown in FIGS. 5 and 6, when the multi-camera device transitions from the wide-angle camera to the telephoto camera (e.g., at the handover point), the pixels within the region of interest indicated by the rectangles 510 and 610 move very little or do not move at all, whereas objects outside the region of interest (e.g., the objects in the background) move much more. In some embodiments, pixels corresponding to other objects having the same depth as the region of interest may also move very little or not move at all at the handover point.

Figure 7:
FIG. 7 illustrates an image generated by a wide-angle camera, according to some embodiments.
Figure 8:
FIG. 8 illustrates an image generated by a telephoto camera and having the same region of interest as the image illustrated in FIG. 7, according to some embodiments.

FIGS. 7 and 8 illustrate another example of the improved zoom feature based on another region of interest. FIG. 7 illustrates an image 700 generated by a wide-angle camera. FIG. 8 illustrates an image 800 generated by a telephoto camera and having the same region of interest as the image illustrated in FIG. 7. As shown in FIGS. 7 and 8, when the multi-camera device transitions from the wide-angle camera to the telephoto camera (e.g., at the handover point), the pixels within the region of interest indicated by the rectangles 710 and 810 move very little or do not move at all, whereas objects outside the region of interest (e.g., the objects in the foreground) move much more. In some embodiments, pixels corresponding to other objects having the same depth as the region of interest may also move very little or not move at all at the handover point.

Advantages of ROI-Based Transformation

Because the region of interest is relatively small compared to the entire target scene, the sparse depth map (e.g., depth map containing depth information for only a subset of the pixels in target scene) in the region of interest is likely to be more accurate when compared to a global depth map having depth information for all pixels in the target scene. For example, when the multi-camera device computes a depth map over the entire target scene, there may be many contours and many objects, which could result in complications. In addition, the ROI-based transformation may reduce the computational complexity and/or processing requirements, since implementing the ROI-based transformation can be done with a fairly simple key point-based algorithm. Further, the ROI-based implementation allows the multi-camera device to design the transform based on the user intention. As discussed herein, within the ROI, the transform may be more accurate and exact than a transform determined based on a depth map over the entire image.

Global Depth Information Vs. ROI-Based Depth Information

With the depth map, for every pixel, a unique transformation can be applied throughout the entire image based on the depth information. For the ROI-based implementation, the multi-camera device may estimate the transformation within the ROI, and that same transformation may be applied to the entire image. Thus, there may be some distortion with respect to the objects outside of the ROI. However, the idea is that the user is not (or less) interested in the regions outside the ROI, and the user may be cropping or ignoring those regions. For example, if the user is focusing on his or her son playing soccer, the trees in the foreground, and the other kids in the background may not be interesting to the user and some distortion in such regions may be acceptable (or even desirable) if the transformation within the ROI is perfect or better than that based on a global depth map (e.g., essentially trading off local accuracy for global accuracy). In some embodiments, the ROI-based transformation is dynamically activated based on the circumstances (e.g., available processing power, accuracy of global depth map, multi-camera device settings, image characteristics, etc.).

Timestamp of Wide-angle and Telephoto Images

In some embodiments, the multi-camera device determines the transform by comparing the wide-angle image and the telephoto image taken at t0, applies the determined transform to the telephoto image taken at t1 immediately subsequent to t0, and causes the transformed telephoto image having a timestamp of t1 to be displayed as the preview image. In other embodiments, the multi-camera device determines the transform by comparing the wide-angle image and the telephoto image taken at t0, applies the determined transform to the telephoto image taken at t0, and causes the transformed telephoto image having a timestamp of t0 to be displayed as the preview image. Other variations are also possible.

Process for Providing Depth-Based Zoom Function

Figure 10:
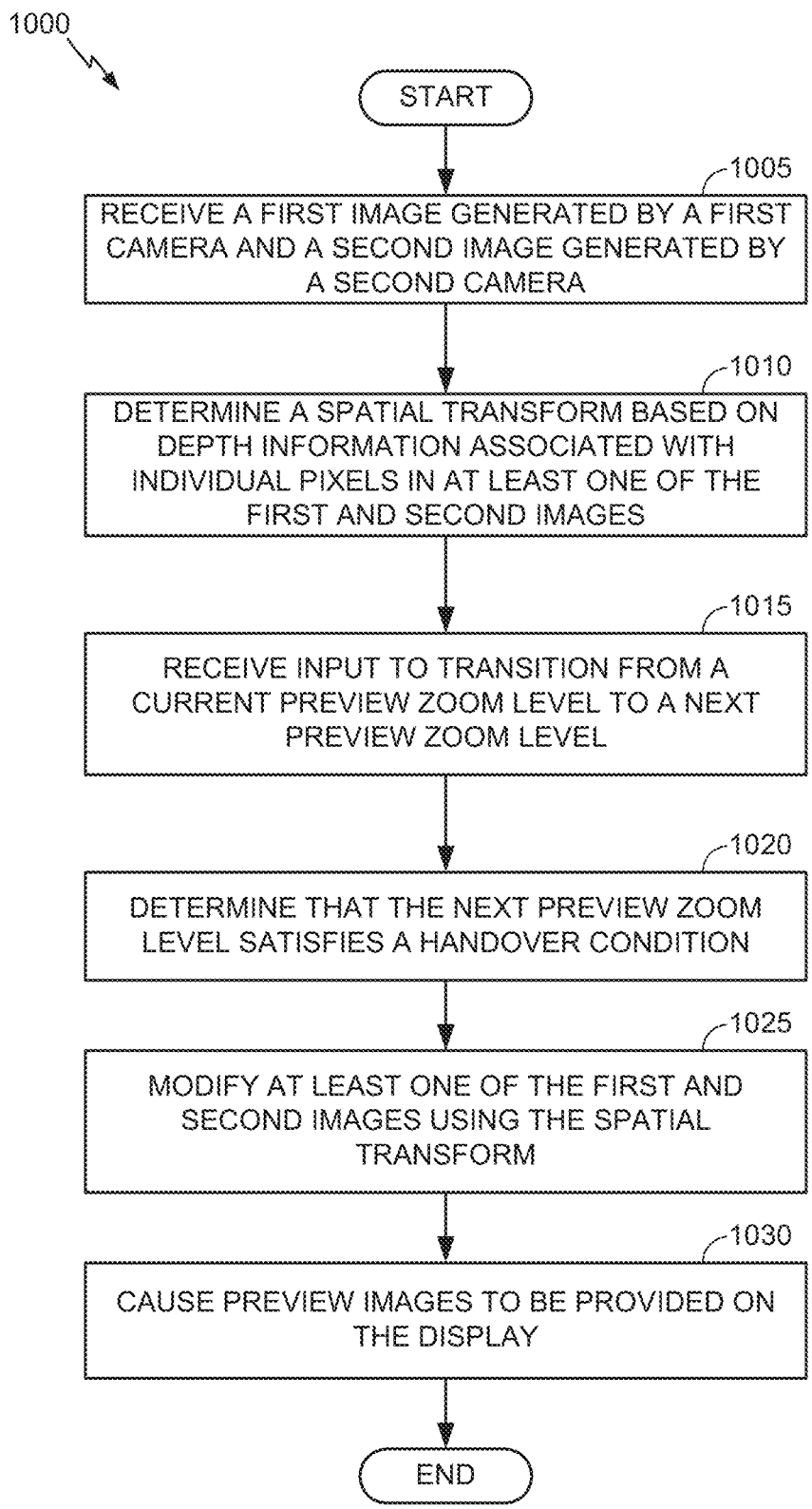
FIG. 10 illustrates a process implementing a zoom function in a multi-camera device to display images generated by different cameras, according to some embodiments.

FIG. 10 illustrates a process 1000 implementing a depth-based zoom function in a multi-camera device to display images generated by different cameras, according to some embodiments. The steps illustrated in FIG. 10 may be performed by one or more processors (e.g., the image processor 320 or the device processor 360 as shown in FIG. 3) or another component described herein. For convenience, the process 1000 is described as performed by a processor of a multi-camera device.

At block 1005, the processor retrieves a first image from a memory of the multi-camera device (e.g., storage module 310 of FIG. 3), where the first image is captured by a first camera of the multi-camera device having a first field-of-view (FOV). In some embodiments, the first camera is a wide-angle camera. The processor may further retrieve a second image from the memory, where the second image is captured by a second camera having a FOV that is narrower than the FOV of the first camera, the first camera and the second camera positioned such that that a target scene in the FOV of the second camera is also in the FOV of the first camera. In some embodiments, the second camera may be a telephoto camera.

At block 1010, the processor determines a spatial transform based on the depth information associated with individual pixels in at least one of the first and second images. The spatial transform includes information to spatially align pixels of the first image and corresponding pixels of the second image. The processor may cause the spatial transform to be saved in the memory of the multi-camera device.

At block 1015, the processor receives input to transition from a current preview zoom level to a next preview zoom level. For example, the user may use a pinch-in or pinch-out gesture to zoom in or out on an object displayed on the preview screen of the multi-camera device. As another example, the user may activate a zoom-in or zoom-out button provided on the multi-camera device.

At block 1020, the processor determines that the next preview zoom level satisfies a handover condition for switching from one of the first and second cameras to the other one of the first and second cameras. For example, the handover condition may be satisfied if the multi-camera device is currently displaying preview images based on images captured by the wide-angle camera and the multi-camera device receives a user input to zoom in beyond a first threshold zoom level. In another example, the handover condition may be satisfied if the multi-camera device is currently displaying preview images based on images captured by the telephoto camera and the multi-camera device receives a user input to zoom out beyond a second threshold zoom level. In some embodiments, the first and second threshold zoom levels may be different.

At block 1025, the processor modifies at least one of the first and second images using the spatial transform based on the next preview zoom level. For example, the multi-camera device may retrieve the previously determined spatial transform, and apply the transform on the telephoto image (when zooming in) or the wide-angle image (e.g., when zooming out).

At block 1030, the processor causes preview images to be provided on the display screen of the multi-camera device, where the preview images are generated based on the transformed first or second image.

In the method 1000, one or more of the blocks shown in FIG. 10 may be removed (e.g., not performed) and/or the order in which the method is performed may be switched. In some embodiments, additional blocks may be added to the method 1000. The embodiments of the present disclosure are not limited to or by the example shown in FIG. 10, and other variations may be implemented without departing from the spirit of this disclosure.

Implementing Systems and Terminology

Implementations disclosed herein provide systems, methods, and apparatus for providing preview images based on images captured by multiple cameras in a seamless manner. One skilled in the art will recognize that these embodiments may be implemented in hardware, software, firmware, or any combination thereof.

In some embodiments, the circuits, processes, and systems discussed above may be utilized in a mobile device. The mobile device may be any kind of electronic device used to capture and display images. Examples of mobile devices include digital cameras, cellular telephones, smart phones, Personal Digital Assistants (PDAs), e-readers, gaming systems, music players, netbooks, laptop computers, tablet devices, etc.

The mobile device may include one or more image sensors, one or more image signal processors, and a memory including instructions or modules for carrying out the depth-based zooming techniques discussed above. The device may also have data, a processor loading instructions and/or data from memory, one or more communication interfaces, one or more input devices, one or more output devices such as a display device and a power source/interface.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A multi-camera device, comprising:
a first camera having a field-of-view (FOV);
a second camera having a FOV that is different than the FOV of the first camera, the first camera and the second camera positioned such that a target scene in the FOV of the second camera is also in the FOV of the first camera;
a display;
one or more processors; and
a memory storing instructions that, when executed by the one or more processors, causes the multi-camera device to:
receive a first image of the target scene from the first camera;
receive a second image of the target scene from the second camera;
determine a spatial transform to spatially align one or more individual pixels of the second image with corresponding pixels of the first image based at least in part on depth information associated with the one or more individual pixels;
receive input to transition from a current preview zoom level to a next preview zoom level, the next preview zoom level exceeding a threshold;
apply the spatial transform to the second image based on the next preview zoom level to generate a modified second image; and
present, on the display, preview images comprising at least the first image and the modified second image, wherein presenting the preview images comprises presenting the first image on the display and replacing the first image on the display with the modified second image.

2. The multi-camera device of claim 1, wherein execution of the instructions further causes the multi-camera device to generate the depth information based on the first and second images.

3. The multi-camera device of claim 1, wherein execution of the instructions further causes the multi-camera device to determine the spatial transform based on the depth information corresponding to all pixel positions within the first image or the second image.

4. The multi-camera device of claim 1, wherein execution of the instructions further causes the multi-camera device to:
determine a region of interest (ROI) with respect to a first preview image provided on the display;
determine ROI-specific depth information corresponding to pixel positions in the ROI but not to other pixel positions outside the ROI; and
determine the spatial transform based on the ROI-specific depth information such that the spatial transform reduces a difference in pixel values in the ROI between the first image and the modified second image.

5. The multi-camera device of claim 4, wherein the difference in the pixel values in the ROI between the first image and the modified second image is zero.

6. The multi-camera device of claim 4, wherein execution of the instructions further causes the multi-camera device to generate the depth information for the ROI and not for regions outside the ROI.

7. The multi-camera device of claim 4, wherein execution of the instructions further causes the multi-camera device to determine the ROI based on a touch input received via a touch screen of the multi-camera device.

8. The multi-camera device of claim 4, wherein execution of the instructions further causes the multi-camera device to automatically detect the ROI using an auto-focus feature of the multi-camera device.

9. The multi-camera device of claim 1, wherein the first camera comprises a wide-angle lens and the second camera comprises a telephoto lens.

10. The multi-camera device of claim 1, wherein execution of the instructions further causes the multi-camera device to switch the first camera from an OFF state to an ON state while the second camera is in the ON state.

11. The multi-camera device of claim 10, wherein execution of the instructions further causes the multi-camera device to switch the second camera from the ON state to the OFF state while the first camera is in the ON state.

12. A method of displaying preview images on a display, the method comprising:
receiving a first image of a target scene from a first camera having a first field-of-view (FOV);
receiving a second image of the target scene from a second camera having a second FOV that is different than the first FOV;
determining a spatial transform to spatially align one or more individual pixels of the second image with corresponding pixels of the first image based at least in part on depth information associated with the one or more individual pixels;
receiving input to transition from a current preview zoom level to a next preview zoom level, the next preview zoom level exceeding a threshold;
applying the spatial transform to the second image based on the next preview zoom level to generate a modified second image; and
presenting, on the display, preview images comprising the first image and the modified second image, wherein presenting the preview images comprises presenting the first image on the display and replacing the first image on the display with the modified second image.

13. The method of claim 12, further comprising:
generating the depth information based on the first and second images.

14. The method of claim 12, further comprising:
determining the spatial transform based on the depth information corresponding to all pixel positions within the first image or the second image.

15. The method of claim 12, further comprising:
determining a region of interest (the ROI) with respect to a first preview image;
determining ROI-specific depth information corresponding to pixel positions in the ROI but not to other pixel positions outside the ROI; and
determining the spatial transform based on the ROI-specific depth information such that the spatial transform reduces a difference in pixel values in the ROI between the first image and the modified second image.

16. The method of claim 15, wherein the difference in the pixel values in the ROI between the first image and the modified second image is zero.

17. The method of claim 15, further comprising:
generating the depth information for the ROI and not for regions outside the ROI.

18. The method of claim 15, further comprising:
determining the ROI based on a touch input received via a touch screen.

19. The method of claim 15, further comprising:
automatically detecting the ROI using an auto-focus feature.

20. The method of claim 12, wherein the first camera comprises a wide-angle lens and the second camera comprises a telephoto lens.

21. The method of claim 12, further comprising:
switching the first camera from an OFF state to an ON state while the second camera is in the ON state.

22. The method of claim 21, further comprising:
switching the second camera from the ON state to the OFF state while the first camera is in the ON state.

23. A non-transitory computer-readable storage medium comprising instructions that, when executed by one or more processors of a multi-camera device, cause the multi-camera device to display preview images on a display by performing operations comprising:
receiving a first image of a target scene from a first camera having a first field-of-view (FOV);
receiving a second image of the target scene from a second camera having a second FOV that is different than the first FOV;
determining a spatial transform to spatially align one or more individual pixels of the second image with corresponding pixels of the first image based at least in part on depth information associated with the one or more individual pixels;
receiving input to transition from a current preview zoom level to a next preview zoom level, the next preview zoom level exceeding a threshold;
applying the spatial transform to the second image based on the next preview zoom level to generate a modified second image; and
presenting, on the display, preview images comprising at least the first image and the modified second image, wherein presenting the preview images comprises presenting the first image on the display and replacing the first image on the display with the modified second image.

24. The non-transitory computer-readable storage medium of claim 23, wherein execution of the instructions further causes the multi-camera device to:
determine a region of interest (ROI) with respect to a first preview image;
determine ROI-specific depth information corresponding to pixel positions in the ROI but not to other pixel positions outside the ROI; and
determine the spatial transform based on the ROI-specific depth information such that the spatial transform reduces a difference in pixel values in the ROI between the first image and the modified second image.

25. The non-transitory computer-readable storage medium of claim 24, wherein the difference in the pixel values in the ROI between the first image and the modified second image is zero.

26. The non-transitory computer-readable storage medium of claim 24, wherein execution of the instructions further causes the multi-camera device to generate the depth information for the ROI and not for regions outside the ROI.

27. A multi-camera device, comprising:
  means for receiving a first image of a target scene from a first camera having a first field-of-view (FOV);
  means for receiving a second image of the target scene from a second camera having a second FOV that is different than the first FOV;
  means for determining a spatial transform to spatially align one or more individual pixels of the second image with corresponding pixels of the first image based at least in part on depth information associated with the one or more individual pixels;
  means for receiving input to transition from a current preview zoom level to a next preview zoom level, the next preview zoom level exceeding a threshold;
  means for applying the spatial transform to the second image based on the next preview zoom level to generate a modified second image; and
  means for presenting, on a display of the multi-camera device, preview images comprising at least the first image and the modified second image, wherein presenting the preview images comprises presenting the first image on the display and replacing the first image on the display with the modified second image.

28. The multi-camera device of claim 27, further comprising:
  means for determining a region of interest (the ROI) with respect to a first preview image;
  means for determining ROI-specific depth information corresponding to pixel positions in the ROI but not to other pixel positions outside the ROI; and
  means for determining the spatial transform based on the ROI-specific depth information such that the spatial transform reduces a difference in pixel values in the ROI between the first image and the modified second image.

29. The multi-camera device of claim 28, wherein the difference in the pixel values in the ROI between the first image and the modified second image is zero.

30. The multi-camera device of claim 28, further comprising:
  means for generating the depth information for the ROI and not for regions outside the ROI.

* * * * *